United States Patent

Nelson

[15] 3,677,568
[45] July 18, 1972

[54] SNOW SLED
[72] Inventor: Gordon E. Nelson, 51 Blossom Lane, Marlboro, Mass. 01752
[22] Filed: Aug. 7, 1970
[21] Appl. No.: 62,023

[52] U.S. Cl. ........................... 280/21 R, 280/21 A
[51] Int. Cl. ........................................... B62b 13/08
[58] Field of Search ............... 280/21 R, 21 A, 16, 12

[56] References Cited

UNITED STATES PATENTS

| | | | |
|---|---|---|---|
| 2,099,731 | 11/1937 | Gelbman | 280/21 |
| 2,846,017 | 8/1958 | Luchterhand | 280/21 |
| 1,946,018 | 2/1934 | Fredrickson | 280/21 A |
| 2,905,479 | 9/1959 | Schomers | 280/21 A |
| 3,145,030 | 8/1964 | Millis | 280/21 A |
| 3,150,880 | 9/1964 | Gust | 280/21 A |
| 3,550,707 | 12/1970 | Lange | 280/21 R |
| 3,583,507 | 6/1971 | Trautwein | 280/21 A |

FOREIGN PATENTS OR APPLICATIONS

| | | | |
|---|---|---|---|
| 218,939 | 2/1910 | Germany | 280/21 |
| 699,324 | 1964 | Canada | 280/21 |

Primary Examiner—Benjamin Hersh
Assistant Examiner—Robert R. Song
Attorney—John E. Toupal

[57] ABSTRACT

Disclosed is a snow sled which may be controlled in a variety of snow conditions by placement and manipulation of several control surfaces including a rearwardly mounted movable rudder which compresses and directs snow, and laterally mounted auxiliary guides.

18 Claims, 16 Drawing Figures

Patented July 18, 1972

Gordon E. Nelson
INVENTOR.

BY John E. Toupal

ATTORNEY.

Gordon E. Nelson
INVENTOR.

BY John E. Toupal

ATTORNEY.

Fig. 9.

Gordon E. Nelson
INVENTOR.

BY John E. Toupal

ATTORNEY.

Fig. 10.

Gordon E. Nelson
INVENTOR.
BY John E. Toupal
ATTORNEY.

Patented July 18, 1972

Gordon E. Nelson
INVENTOR.

BY John E. Toupal

ATTORNEY.

SNOW SLED

BACKGROUND OF THE INVENTION

This invention relates generally to snow sleds, and more particularly to steering control of non-internally powered snow vehicles.

Large surface sleds, such as tobogans can be operated on either paced or powder snow, however, they lack means of control. This factor, together with the high speeds attained can cause a serious danger to both the operator and bystanders. Runner type sleds do provide a certain degree of control; however, their use is limited to hard surface conditions. "Skibike" type sleds, with their high center of mass, lack stability and therefore require skilled operators. They can be used on packed or loose snow, but are dangerous in varying snow conditions. It is difficult to find any slope with consistent snow conditions, and so one is usually forced to choose between lack of control and the risk of rapidly changing conditions.

The object of this invention is to provide a sled which can be operated, and easily and efficiently controlled, on snow, the surface of which varies from packed to powder.

SUMMARY OF THE INVENTION

This invention is characterized by a snow sled including a rudder assembly and steering mechanism mounted on a frame. In a preferred embodiment the rudder assembly and the steering mechanism are mounted on opposite ends of the frame. Supporting the frame is a slide surface that contacts snow during use of the sled. The advantage of this invention is that the rudder facilitates guidance of the sled when operated in a variety of snow surface conditions.

One feature of this invention is the unique rudder assembly. The rudder is in the form of an open bottom housing with snow passages at the front and rear ends. The volume enclosed by the rudder is of variable cross-sectional area, decreasing from front to rear. During operation of the sled, loose snow moving through the rudder housing is both directed and compressed. The compression enlarges the reaction forces generated, thereby increasing the efficiency of the rudder. Sharp bottom edges on vertical walls of the rudder housing penetrate the surface of packed snow to enhance performance of the rudder mechanism when operating under hard surface conditions. A rudder coupling between the steering control mechanism and the rudder assembly allows not only rotational movement of the rudder assembly for sled guidance, but also allows selectively controlled reciprocating vertical motion thereof. Because of the latter feature, the rudder assembly need be in contact with the snow only during turning operations.

The rearwardly mounted rudder initially provides a rotational force in a horizontal plane about the center of mass of the sled and the natural momentum of the sled tends to continue to translate the center of mass in the same direction. Consequently, the sled will tend to slide sideways relative to the forward to rear axis of the sled. Other features of this invention counteract this effect. Rigid auxiliary guide members are included on each side of the slide surface of the sled. During turning operations, guide members forcibly engage snow thereby resisting transverse motion. They are sloped to compress snow under the sled during transverse motion, thereby facilitating the effect of a kneel which is mounted on the bottom of the slide surface.

In this embodiment the slide surface, which supports the driver and the frame, is preferably flexible to allow it to remain in contact with the snow over irregular terrain. Snow compression created by the slide surface further increases the efficiency of the rudder in extremely loose snow. The frame, the auxiliary guide members and the kneel are rigid and are attached by coupling mechanisms which allow relative motion of these devices with respect to the flexible slide surface.

One more feature of the invention is the inclusion of lateral closures between the edge of the slide surface and the frame. These closures resist transverse motion and prevent snow from entering the area where the driver sits.

In another preferred embodiment of the invention, a similar rudder assembly is used, and rotary and thrust couplings are also provided. However, the slide surface is rigid and an upturned lip extends around the edges thereof. The auxiliary guides, which are movable, do not contact the snow, unless there is specific actuation of the steering control, and no kneel is used. This embodiment, normally having only a smooth slide surface in contact with the snow, allows an operator who is seeking a more thrilling ride to rotate or twirl the sled during use. When desired, control is achieved by moving the edges of the guides and the rudder downward to engage the snow. Couplings between the slide surface, frame and guides are rigid in this embodiment.

DESCRIPTION OF THE DRAWINGS

The objects and features of the present invention will become more apparent upon an examination of the following description taken in conjunction with the accompanying drawings wherein.

DESCRIPTION OF THE PREFERRED EMBODIMENTS

Figure 1:
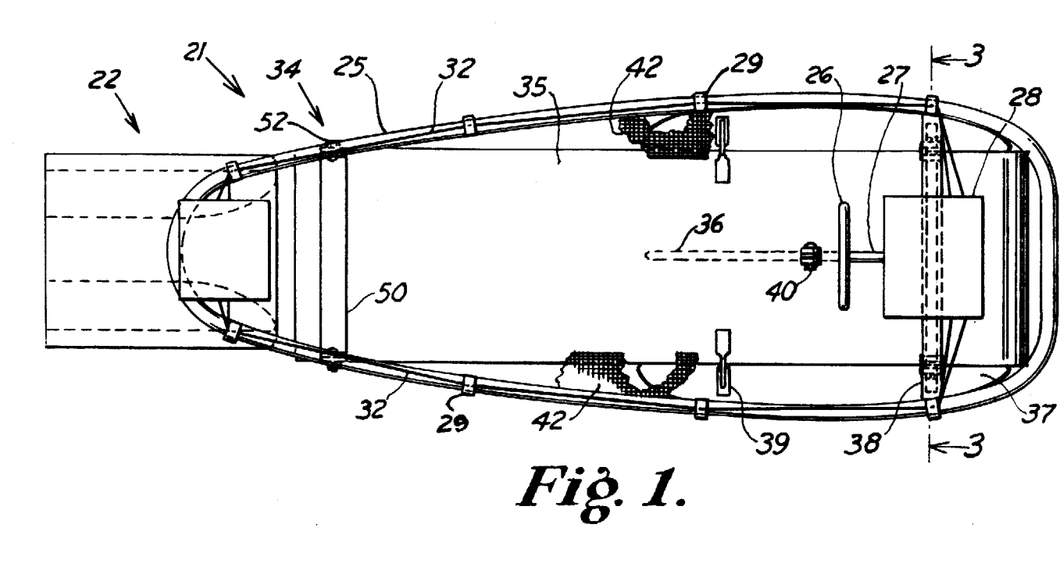
FIG. 1 is a top view of a preferred embodiment of the invention.
Figure 2:
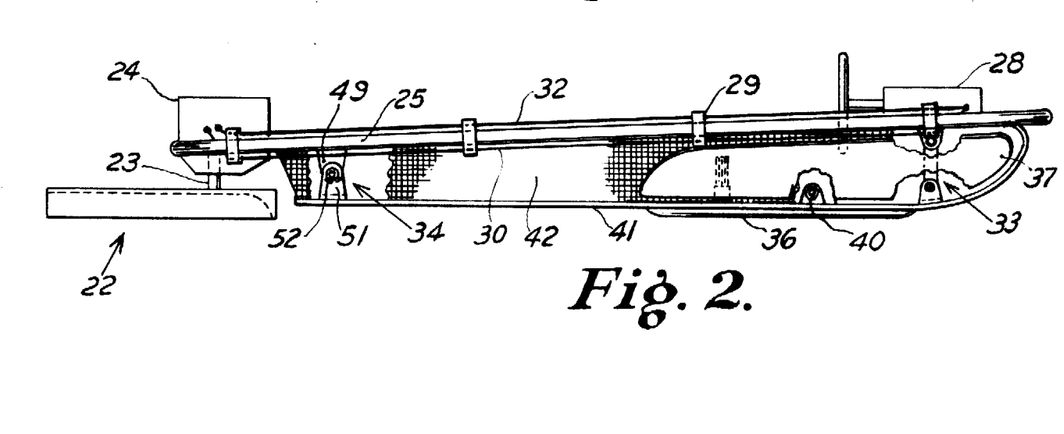
FIG. 2 is a side view of the embodiment shown in FIG. 1.
Figure 3:
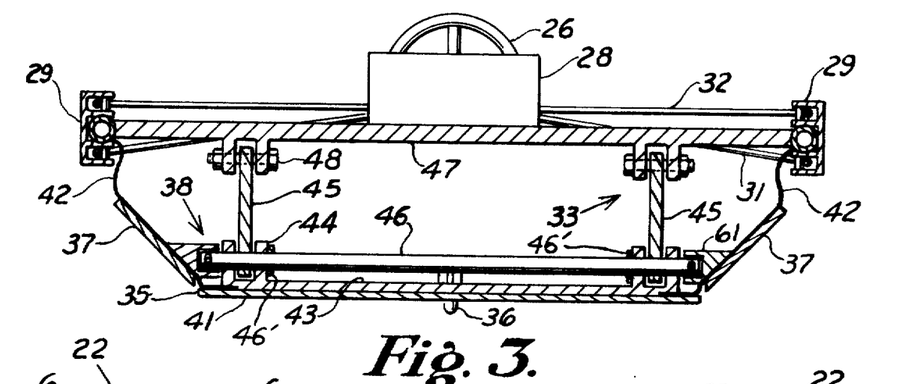
FIG. 3 is a cross-sectional view taken along lines 3—3 in FIG. 1.

Referring to FIGS. 1 through 3, there is shown a snow sled 21, including a rear mounted rudder assembly 22. An axial rod 23 connects the rudder assembly 22 to a rudder coupling mechanism (described hereinafter) enclosed in a rear control housing 24 mounted on a frame 25. Disposed at the opposite end of the sled 21 is a steering wheel 26 mounted on a shaft 27. Coupled to the shaft 27 is a guidance control mechanism (described hereinafter) enclosed in a front control housing 28 mounted on the frame 25. Cable guides 29, mounted on the frame 25, direct the steering and thrust control cables 30, 31 and 32 which couple the guidance control mechanism and rudder coupling mechanism. Front and rear support bearings 33 and 34 hold the frame 25 to a support surface 35.

Longitudinal auxiliary guides 37 are mounted on the support surface 35 by forward and rear guide mounts 38 and 39. A central elongated keel 36 is attached to the support surface 35 at a single point by a pin 40. On the lower side of the support surface 35 is a slide surface 41, and from its edges to the frame 25 extend flexible lateral closures 42.

Referring now to FIG. 3, a detail of the forward support bearings 33 is shown. Mounted on the support surface 35 is a bracket 43 with two vertical tabs 44 extending upward from each end. Positioned between these tabs are vertical coupling bars 45. Passing through holes in the tabs 44 are coupling bars 45, is a transverse rod 46 axially retained by rings 46'. A transverse member of the frame 47 has similar tabs extending vertically downward therefrom and the upper ends of the coupling bars 45 are secured to these tabs by means of bolts 48. FIG. 2 shows in greater detail the rear support bearings 34. Vertical tabs 49 extend downward from the frame 25 and the ends of the rear bracket 50 are bent upward as vertical tabs 51. Fastening the tabs 49 and 51 are bolts 52.

Figure 4:
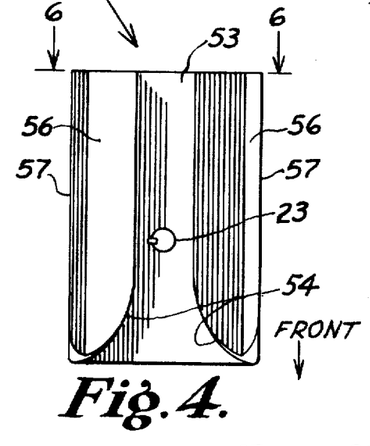
FIG. 4 is a bottom view of the rudder assembly shown in FIG. 1.
Figure 5:
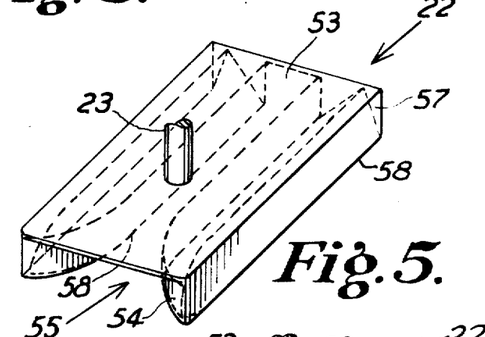
FIG. 5 is a perspective view of the rudder assembly shown in FIG. 4.
Figures 6, 7:
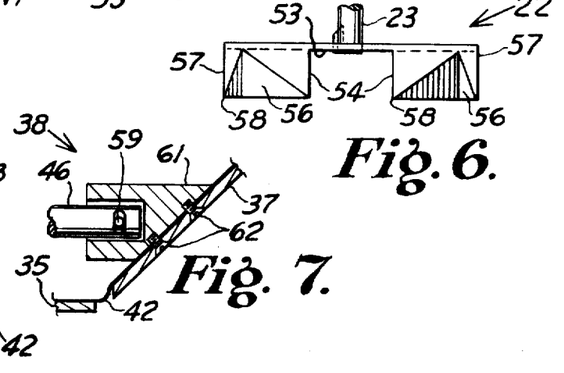
FIG. 6 is a rear view of the rudder assembly.
FIGS. 7 and 8 show detail drawings of couplings employed with auxiliary guides shown in FIG. 1.

Referring now to FIGS. 4, 5 and 6, there is shown in greater detail the rudder assembly 22. A top wall 53 and converging vertical walls 54 form an open bottom housing 55 with a snow passage at each end. From front to rear, there is a decrease in cross-sectional area of the volume enclosed. Disposed outside of the vertical walls 54, and separated therefrom by channels 56, are outer vertical walls 57. Sharp edges 58 are formed on the bottoms of vertical walls 54 and 57.

Figure 8:
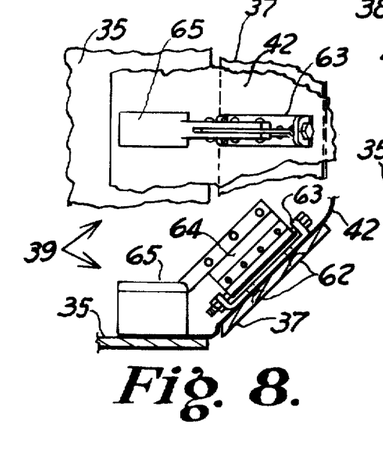

FIG. 7 shows in greater detail the forward guide mounts 38. Pins 59 hold a block 61 to the end of the transverse rod 46, but allow rotational motion therebetween. Machine screws 62 secure the auxiliary guide 37 to the block 61. Rear guide mounts 39 are shown in FIG. 8. A ribbon bracket 63, secured to auxiliary guide surfaces 37 with machine screws 62, is coupled by a flexible ribbon web 64 to an anchor block 65 mounted on the support surface 35.

Figure 9:
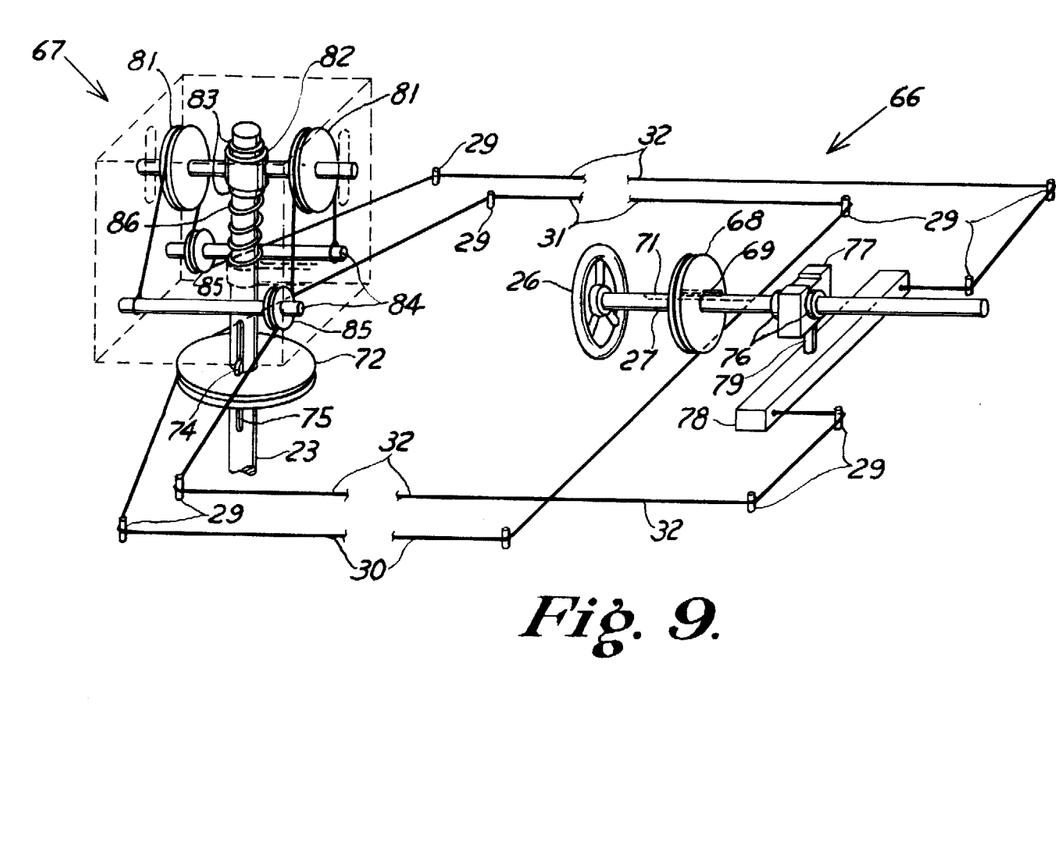
FIG. 9 is a schematic detailed view of the guidance control mechanism and rudder coupling assembly shown in FIG. 1.

Referring now to FIG. 9, there is shown a diagram of the guidance control and rudder coupling mechanisms 66 and 67 noted above. A forward steering pulley 68 is mounted on the shaft 27 by means of a key 69 riding in an elongated key slot 71. This assembly allows relative sliding but not rotary motion between the pulley 69 and the shaft 27. Coupling a rear steering pulley 72 to the forward steering pulley 68 and attached thereto are steering cables 30 and 31. To provide increased angular rotation of the pulleys 68 and 72, they are wrapped one or more times by the cables 30 and 31. A key 74 riding in an elongated key slot 75 couples the rear steering pulley 72 to the axial rod 23 and therefore to the rudder 22. Retaining rings 76 on either side of a translation block 77 allow it to rotate freely with respect to the shaft 27 but not to slide thereupon. A tension balance bar 78 is connected to the block 77 with a pivot pin 79. Thrust cables 32 connect the tension balance bar 78 with rear thrust pulleys 81. A thrust pulley mount 82 upon which the rear thrust pulleys 81 are mounted, is attached to the axial rod by retaining rings 83. The thrust cables 32 are not connected to the thrust pulleys 81, but are connected to cable pins 84. Each cable 32 has an end connected to one of the pins 84, is wrapped one-half turn around a pulley 81 and then one-quarter turn around a pin pulley 85. The cables 32 then extend through the guides 29 to the tension balance bar 78. When the steering mechanism is at rest, a spring 86 holds the pulley support 82 in its uppermost position, and therefore keeps the thrust cables 32 taut.

During operation of the preferred embodiment hereinbefore described, the flexible slide surface 41 remains in contact with the snow as the sled 21 moves down a slope. Use of a large contact area for the slide surface 41 allows operation over both packed or loose snow surfaces. During straight running, the keel 36 and auxiliary guides 37 have little effect on the operation due to their parallel orientations with respect to the slide surface 41. With the steering wheel 26 at rest, the spring 86 pushes against a retaining ring 83 holding the rudder assembly 22 clear of the surface of the snow thereby reducing drag.

When the operator wishes to make a turn, he draws the steering wheel 26 toward him. This motion pulls the thrust cables 32 toward the front of the snow sled 21 thereby shortening the length of the thrust cables which is between the two thrust cable pins 84, drawing the thrust pulleys 81 and therefore the axial rod 23 in a downward direction, and causing the rudder assembly 22 to operatively engage the snow surface. Simultaneous the operator would control the direction of the rudder 22. Suppose, for example, that he wishes to make a right hand turn. Turning the steering wheel 26 clockwise, as one would to make a right hand turn in an automobile, cause the front steering pulley 68 to turn in a like manner, thereby pulling on the steering cable 30 and effecting subsequent rotation of the rear steering pulley 72 in a counterclockwise (as viewed from above) direction. The axial rod 23 is thereby rotated causing the rudder assembly 22 to also rotate in a counterclockwise direction. Reaction force produced in the snow engaged by the activated rudder 22 tends to divert the sled 21 toward the right. It will be obvious that a left hand turn of the sled 21 is effected in an analogous manner by turning the steering wheel 26 in a counterclockwise direction.

If the sled 21 is being operated on a hard surface, the rudder 22 will supply a turning force when put in contact with the snow and rotated as the bottom edges 58 dig into and forcibly engage the snow. When operating in loose snow, the slide surface 41 remains in contact with the snow surface and applied a uniform compression in a vertical direction thereto. Moving through the rudder assembly 22, the partially compressed snow is further compressed in a horizontal direction by the convergence of the vertical walls 57, increasing the density and the hardness of the snow, and thereby providing the walls 57 with a more efficient reaction. Pressure on the snow during compression creates a bond between the snow contained in the open bottom housing 55 and the snow base below, further increasing the turning efficiency in loose snow. This bond is similar to the bond created between surface snow and snow compressed in the treads of so-called snow tires. When the snow is compressed between the walls 54, a larger percentage of the snow enclosed between them will respond as a single mass, exerting a corresponding larger force on the appropriate wall when the surfaces are at an angle to the direction of motion. Snow also passes through the channels 56 providing more contact area with the rudder 22 and thereby increasing turning force. Operation in snow varying between a packed surface and a loose surface entails a combination of the effects described.

Being perpendicular to the path of motion of the sled 21, the turning force supplied by the rudder 22 will tend to drive the rear of the sled to the side. This creates a tendency for the sled to side slip in the direction of previous motion rather than turn. Auxiliary guides 37 resist such side slipping, or transverse motion, by forcibly engaging the snow on their sloping outer surfaces, which also compress the snow and force it under the slide surface 41 where it is engaged by the keel 36. The resultant forces cause the sled 21 to maintain forward motion in a straight line path, but in a new direction. The lateral closures 42 assist in this action and prevent the entrance of snow into the area occupied by the driver.

As noted above, the support surface 35 is flexible, while the frame 25, the auxiliary guides 37 and the keel 36 are rigid, making it preferable that the attachments of these various components allow relative motion between them. Inclusion of a double bearing on the forward supports 34 allows moderate changes in relative length as well as changes in angle of inclination between the frame 25 and support surface 35, permitting the latter to flex freely to follow the terrain. As described previously, the pin 40 provides a single point fixation to the keel 36 thereby rendering it independent of the flexure of the support surface 35. Rotational motion only is allowed by forward guide mounts 38 as shown in FIG. 7 and described hereinbefore, however, the rear guide mounts 39 shown in FIG. 8 also described hereinbefore, allow motion in forward and backward directions. Therefore, auxiliary guides 37 do not interfere with the flexure of the support surface 35.

Figure 10:
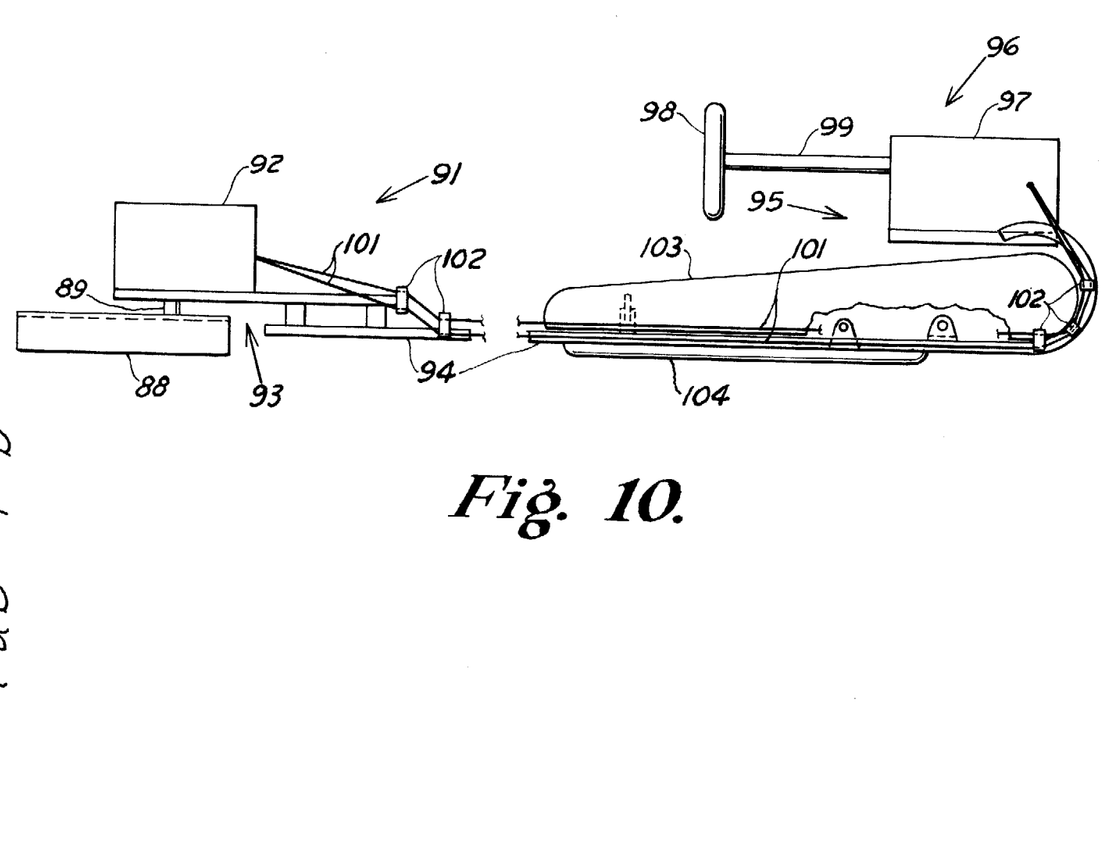
FIG. 10 is a side view of another embodiment of the invention.

FIG. 10 shows an alternate embodiment on which the controls are mounted on a conventional toboggan, a rudder 88 is connected by an axial rod 89 to a rudder coupling mechanism 91. A rear control housing 92 encloses the coupling mechanism 91 and is mounted on a rear frame section 93 therewith. Holding both the rear frame 93 and a front frame 95 is a support surface 94. A guidance control mechanism 96, which is enclosed in a front control housing 97 is mounted on the front frame 95. A steering wheel 98 is connected to the control mechanism 96 by a shaft 99. Connecting the mechanisms 91 and 96 are cables 101 passing through cable guides 102. Auxiliary guides 103 and a keel 104 are mounted on the support surface 94 in manners similar to those described for the embodiment shown in FIGS. 1–3. All components are similar to the corresponding components on the previously described embodiment, with the exception that the frame is now divided into separate units 93 and 95. The sled shown in FIG. 10 is operated in the manner described above.

Figure 11:
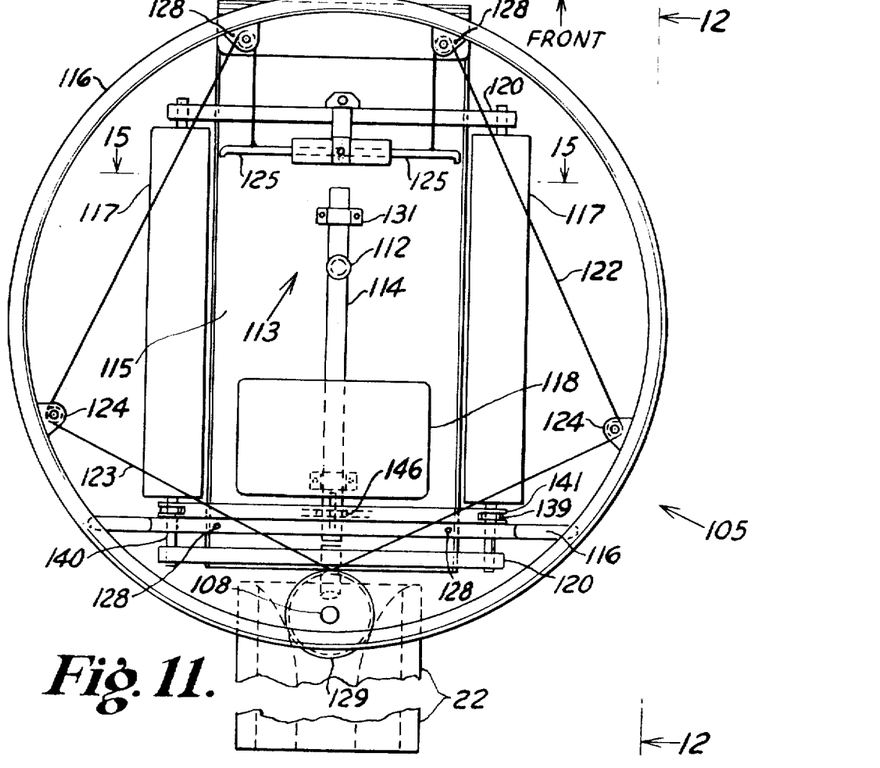
FIG. 11 is a top view of a third embodiment of the invention.
Figure 12:
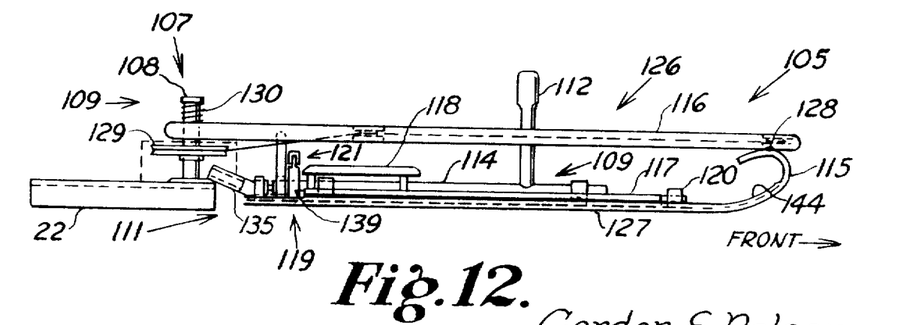
FIG. 12 is a side view of the embodiment shown in FIG. 11.

Referring now to FIGS. 11 and 12, a third preferred embodiment 105 is shown. Connecting a rear mounted rudder assembly 22 with a rudder coupling mechanism 107 is an axial rod 108. The rudder assembly 22 is the same as that hereinbefore described in FIGS. 4–6. A rotary coupling 109 and a thrust coupling 111 are included in the rudder coupling mechanism 107. Connecting a steering control stick 112 with the thrust coupling 111 is part of a guidance control system 113 comprising a shaft 114, which is mounted on a support surface 115. Also mounted on the support surface 115 are a frame 116, a pair of auxiliary guides 117 and a seat 118. The guides 117 are mounted by guide couplings 119 which are connected to the control stick 112 by an integrated guide control mechanism 121. Included in the guide couplings 119 are bearing support bars 120. Steering cables 122 and 123, passing through cable guides 124, connect the rotary coupling mechanism 109 with steering control pedals 125. A steering control mechanism 126 includes the control stick 112 and the steering control pedals 125. On the bottom of the support surface 115 is a slide surface 127. In this embodiment, the support surface 115 and the frame 116 are rigid, and are fixed together at four points 128.

Considering again the rotary coupling 109, there is shown a rear steering pulley 129 mounted on the axial rod 108. The pulley 129 is retained by a key in an elongated slot as was the pulley 72 (FIG. 9) in the first described embodiment 21.

Figure 13:
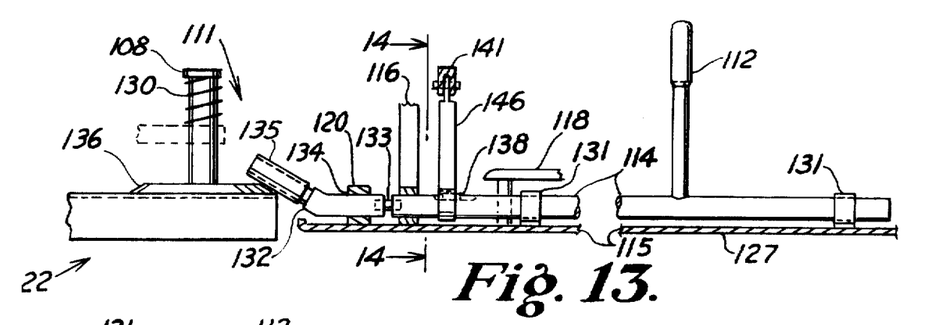
FIG. 13 is a section showing details of the thrust coupling and parts of the guidance control and steering control in the embodiment shown in FIG. 11.

Referring to FIG. 13, there is shown a detail of the thrust coupling 111. Holding the shaft 114 to the support surface 115 are bearing blocks 131 which allow sliding and rotary motion. A square thrust rod 132 is coupled to the rear end of the shaft 114 by a single pin 133 to allow only rotary motion therebetween. Securing the square rod 132 to the support surface 115 is a square opening 134 in the rear bearing support bar 120. On the end of the rod 132 is a rotatable cylindrical sleeve 135 pressing against an inclined plane disc 136, which is mounted on top of the rudder assembly 22 concentrically with the axial rod 108. A bend in the square rod 132 between the opening 134 and the sleeve 135, disposes the sleeve at an angle with respect to the rudder 22, therefore longitudinal motion of the square rod causes downward motion of the rudder which is opposed by a spring 130.

Figure 14:
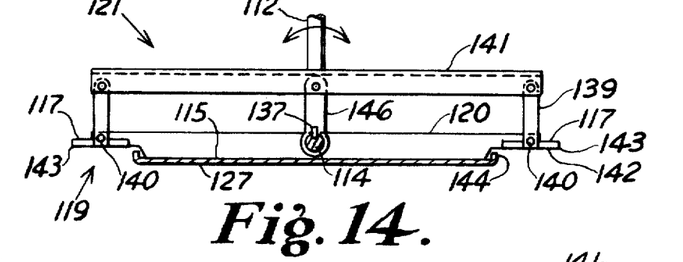
FIG. 14 is a second section, taken along lines 14—14 in FIG. 11, showing detail of the guide control means employed in the embodiment shown in FIG. 11.

FIGS. 11, 13 and 14 show in greater detail the guide couplings 119 and integrated guide control mechanism 121. Each guide 117 is attached to bearing support bars 120 with bearings 140. A vertical coupling bar 146 is mounted on the shaft 114 with a key 137 riding in an elongated key slot 138, allowing sliding but rotary motion. Orientation rods 139 are attached to the upper surfaces of the guides 117. Connecting the tops of the vertical coupling bar 146 and the orientation rods 139 is a horizontal positioning bar 141. The control stick 112, vertical coupling bar 146 and orientation rods 139 are all substantially parallel to each other and perpendicular to the guides 117. With the control stick 112 perpendicular to the snow surface, the bottom guide surfaces 142 are substantially parallel thereto, but being above the slide surface 127, neither they nor the guide edges 143 contact the snow.

Referring to FIGS. 12 and 14–16, an upturned lip 144 extends around the edge of the slide surface 127.

During operation of the embodiment described above, the guides 117 and rudder 22 are normally positioned above the snow surface. With only smooth slide surface 127 in contact with the snow, the sled 105 is free to slide or rotate in any direction.

When the operator wishes to make a turn, he draws the control stick 112 toward him. This motion forces the square rod 132 back, causing the sleeve 135 to push down on the inclined plane disc 136, and therefore, on the rudder 22 which engages the snow surface. Simultaneously, the operator would control the direction of the rudder 22. Suppose, for example, that he wishes to make a right hand turn. Pushing on the right control pedal 125 causes the left control cable 123 to be pulled toward the front of the sled 105, resulting in a counter-clockwise (when viewed from above) rotation of the rear steering pulley 129 and the rudder 22. Reaction force produced in the snow engaged by the activated rudder 22 tends to divert the sled 105 toward the right. A left hand turn of the sled 105 is effected in an analogous manner by pushing the left steering pedal 125.

If the sled 105 is being operated on a hard surface, the rudder 22 (Refer to FIGS. 4–6 for operation of rudder.) will supply a turning force when put in contact with the snow and rotated as the bottom edges 58 dig into and forcibly engage the snow. When operating in loose snow, the slide surface 127 applies a compression in a vertical direction to the snow surface. Moving through the rudder assembly 22, the partially compressed snow is further compressed in a horizontal direction by the convergence of the vertical walls 54, increasing the density and the hardness of the snow, and thereby providing the walls 54 with a more efficient reaction. Pressure on the snow during compression creates a bond between the snow contained in the open bottom housing 55 and the snow base below, further increasing the turning efficiency in loose snow. This bond is similar to the bond created between surface snow and snow compressed in the threads of so-called snow tires. When the snow is compressed between the walls 54, a larger percentage of the snow enclosed between them will respond as a single mass, exerting a correspondingly larger force on the appropriate wall when the surfaces are at an angle to the direction of motion. Snow also passes through the channels 56 providing more contact area with the rudder 22 and thereby increasing turning force. Operation in snow varying between a packed surface and a loose surface entails a combination of the effects described.

Figure 15:
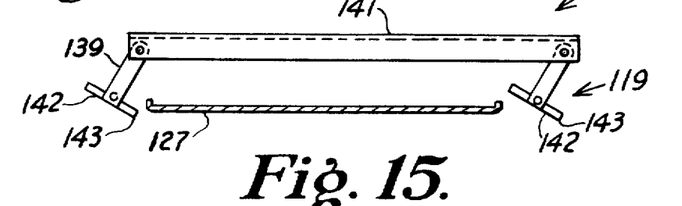
FIGS. 15 and 16 are sections taken along lines 15—15 showing examples of guide orientations used during operation.
Figure 16:
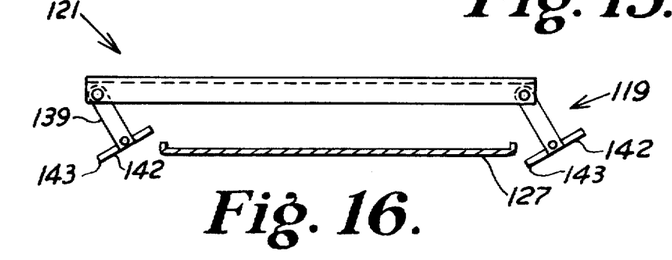

Being perpendicular to the path of motion of the sled 105, the turning force supplied by the rudder 22 will tend to drive the rear of the sled to the side. This creates a tendency for the sled to side slip in the direction of previous motion rather than turn. Auxiliary guides 117 resist such side slipping, or transverse motion. Moving the control stick 112 to the right causes the right guide edges 143 to move downwardly and the guide surfaces 142 to rotate and thereby engage snow during transverse motion to the left (caused when making a right turn). These effects are shown in FIG. 15. Obviously, during a left turn, and resultant rightward transverse motion, the guides would be set as shown in FIG. 16 by a leftward motion of the control stick 112. If the guides 117 are not used during turning efforts, spinning, or twirling of the sled 105 will result. This may be done at the discretion of the operator, if he wishes a more thrilling ride. The lip 144 prevents the edge of the slide surface 127 from digging into the snow during rotation. Engagement of the guides 117 and the rudder 22 will quickly restore control, and cause the sled 105 to again assume a straight path.

Obviously, many modifications and variations of the present invention are possible in light of the above teachings. It is to be understood, therefor, that the invention can be practiced otherwise than as specifically described.

What is claimed is:

1. A snow sled comprising:
    a. a frame;
    b. a support member attached to and adapted to support said frame from a snow surface during use of said sled, said support member comprising a slide surface for contact with the snow surface;
    c. rudder assembly disposed adjacent one end of said slide surface, said rudder assembly including a control surface for contacting the snow surface; said control surface comprising vertical and top walls which define an open bottom housing with front and rear snow passage openings, said housing enclosing a volume of varying vertical cross-sections that decrease in size in the direction of said rear snow passage opening;
d. rudder coupling means comprising rotary coupling means attaching said rudder assembly to said frame, said rotary coupling means providing for rotary movement of said rudder assembly about a substantially vertical axis;
e. steering means; and
f. guidance control means connected between said rudder coupling means and said steering means and operable to produce selective rotation of said rudder assembly.

2. A snow sled according to claim 1 wherein said rudder coupling means comprises a thrust coupling providing for vertical reciprocating movement of said rudder assembly in response to selective actuation of said steering means.

3. A snow sled according to claim 2 wherein said vertical walls include portions that converge in the direction from said front opening to said rear opening so as to provide said cross-sections of decreasing size.

4. A snow sled according to claim 2 including a pair of auxiliary guide members laterally disposed on opposite sides of said elongated slide surface, said guide members including guide surfaces oriented substantially parallel to said elongated slide surface so as to forcibly engage snow during transverse motion of said sled.

5. A snow sled according to claim 2 wherein said support member comprises a flexible material sheet with a bottom surface forming said slide surface and an upper surface for supporting an operator of the sled.

6. A snow sled according to claim 5 including a pair of auxiliary guide members laterally disposed on opposite sides of said elongated slide surface, said guide members including guide surfaces oriented substantially parallel to said elongated slide surface so as to forcibly engage snow during transverse motion of said sled, and including a guide coupling means for attaching said auxiliary guide members to, and allowing motion with respect to said support member.

7. A snow sled according to claim 6 wherein said control surface comprises vertical and top walls which define an open bottom housing, with front and rear snow passage openings, said housing enclosing a volume of varying vertical cross-sections that decrease in size in the direction of said rear snow passage opening.

8. A snow sled according to claim 7 wherein said frame is rigid and including a coupling means for allowing relative motion between said support member and said frame.

9. A snow sled according to claim 8 including a lateral closure means extending between the lateral edges of said upper surface and said frame for preventing movement of snow onto said upper surface during transverse motion of said sled.

10. A snow sled according to claim 9 including an elongated keel member projecting below said elongated slide surface and extending centrally and longitudinally thereof, and wherein said guide surfaces are inclined downwardly toward said slide surface so as to compress snow thereunder during transverse movement of the sled.

11. A snow sled according to claim 10 including attachment means connecting said keel and said support member, said attachment means permitting relative movement between said keel and said slide surface.

12. A snow sled according to claim 2 wherein said vertical walls of said rudder assembly comprise bottom edges that penetrate the compressed snow surface created by said slide surface in response to actuation of said steering means.

13. A snow sled according to claim 1 wherein said steering means is disposed on the end of said frame opposite said one end.

14. A snow sled according to claim 1 including a pair of auxiliary guide members laterally disposed on opposite sides of said slide surface, said guide members comprising guide surfaces and guide edges.

15. A snow sled according to claim 14 including a guide coupling means providing for movement of said guide edges relative to and in direction perpendicular to said slide surface.

16. A snow sled according to claim 15 wherein said guidance control means comprises guide control means connected between said steering means and said guide coupling means, said guide control means inducing said movement of said guide edges in response to actuation of said steering means.

17. A snow sled according to claim 16 wherein said guide control means comprises integrated control means providing for rotary motion of both of said guide members in the same direction in response to a particular actuation of said steering means and rotary motion of both of said guides in the opposite direction in response to a different actuation of said steering means.

18. A snow sled according to claim 17 wherein said support member comprises a rigid material sheet with a bottom surface forming said slide surface and an upper surface for supporting an operator of the sled.

* * * * *